US009184771B2

(12) United States Patent
Laporte

(10) Patent No.: US 9,184,771 B2
(45) Date of Patent: Nov. 10, 2015

(54) DIGITAL DOWN CONVERSION AND DEMODULATION

(75) Inventor: Pierre-Andre Laporte, Gatineau (CA)

(73) Assignee: Optis Cellular Technology, LLC, Plano, TX (US)

( * ) Notice: Subject to any disclaimer, the term of this patent is extended or adjusted under 35 U.S.C. 154(b) by 742 days.

(21) Appl. No.: 13/271,515

(22) Filed: Oct. 12, 2011

(65) Prior Publication Data

US 2013/0094616 A1   Apr. 18, 2013

(51) Int. Cl.
*H03K 9/00* (2006.01)
*H04L 27/06* (2006.01)
*H04B 1/00* (2006.01)

(52) U.S. Cl.
CPC .................................. *H04B 1/0025* (2013.01)

(58) Field of Classification Search
USPC ............... 375/222, 240.26–240.29, 295, 309, 375/310, 316, 326, 324, 346–348, 344, 341, 375/338, 339, 354, 355, 219, 220, 340, 254, 375/285, 284, 325, 342
See application file for complete search history.

(56) References Cited

U.S. PATENT DOCUMENTS

| | | | |
|---|---|---|---|
| 6,005,506 A | 12/1999 | Bazarjani et al. | |
| 6,061,551 A | 5/2000 | Sorrells et al. | |
| 6,243,430 B1 | 6/2001 | Mathe | |
| 6,363,123 B1 * | 3/2002 | Balodis ......................... | 375/316 |
| 6,507,303 B1 | 1/2003 | Alelyunas et al. | |
| 7,489,745 B2 * | 2/2009 | Fudge ............................ | 375/340 |
| 7,706,476 B2 | 4/2010 | Jiang et al. | |
| 8,244,202 B2 * | 8/2012 | Kitayabu ....................... | 455/344 |
| 8,300,680 B2 * | 10/2012 | Pals et al. ........................ | 375/219 |
| 8,462,887 B1 * | 6/2013 | Tsai et al. ....................... | 375/324 |
| 2002/0163981 A1 | 11/2002 | Troemel, Jr. | |
| 2006/0018408 A1 * | 1/2006 | Bock et al. ..................... | 375/322 |
| 2007/0052560 A1 | 3/2007 | Van Der Veen et al. | |
| 2007/0060077 A1 * | 3/2007 | Qian .............................. | 455/130 |
| 2007/0081617 A1 * | 4/2007 | Fudge ............................ | 375/350 |
| 2007/0087717 A1 * | 4/2007 | Handa et al. ................ | 455/276.1 |
| 2008/0026717 A1 * | 1/2008 | Huynh .......................... | 455/266 |
| 2008/0107213 A1 | 5/2008 | Gupta et al. | |
| 2009/0225647 A1 * | 9/2009 | Matsumoto et al. .......... | 370/210 |
| 2009/0310712 A1 * | 12/2009 | Nakatani ....................... | 375/316 |
| 2010/0104001 A1 * | 4/2010 | Lee et al. ...................... | 375/240 |

FOREIGN PATENT DOCUMENTS

GB           2382282 A      5/2003
WO       2010151650 A1   12/2010

OTHER PUBLICATIONS

PCT International Search Report PCT/IB2012/055258.
Second Written Opinion of the International Preliminary Examining Authority, Application No. PCT/IB2012/055258, mailed Sep. 12, 2013.
PCT International Search Report and Written Opinion dated Jan. 24, 2013, Application No. PCT/IB2012/055258, 13 pgs.
Chinese Office Action dated Mar. 24, 2015, 9 pgs.

* cited by examiner

*Primary Examiner* — Linda Wong

(57) ABSTRACT

A method and apparatus for digital down conversion and demodulation of a radio frequency (RF) signal are disclosed. A sampling frequency for sampling the RF signal is chosen, based on a bandwidth and a safety margin, so that a bandwidth of the sampled signal falls substantially within a predetermined frequency zone. The sampled signal may be digitally demodulated at a demodulation frequency selected to be substantially equal to a baseband alias of a carrier frequency of the signal.

18 Claims, 6 Drawing Sheets

DIGITAL DOWN CONVERSION AND DEMODULATION

TECHNICAL FIELD

The present invention relates to wireless communications, and in particular to a method and system for digital down conversion and demodulation of radio frequency (RF) signals.

BACKGROUND

In wireless receivers, the RF signal that is captured by an antenna of the receiver must be converted to baseband before the information in the signal can be extracted and used by applications. Many wireless communication standards use quadrature modulation to impress information onto an RF carrier. To demodulate such signals, receivers typically use one of a variety of analog processing methods implemented in one of a variety of receiver types, including: heterodyne receivers, super-heterodyne receivers, homodyne receivers, single conversion low intermediate frequency (IF) receivers, and double conversion wideband IF receivers.

Analog receiver designs are typically difficult to modify and tune and must be customized for a particular frequency band of operation. Newer wireless standards, such as the long term evolution (LTE) standard specify many different bands of operation. One drawback of using analog designs for operation over different frequency bands is the non-recurring engineering cost associated with a re-design of a receiver for each and every frequency band.

Further, designs that rely on analog processing suffer from performance degradation caused by electronic noise, temperature variations, voltage variations, manufacturing defects and component aging. Therefore, receiver designs that minimize reliance on analog processing are desired.

SUMMARY

The present invention advantageously provides a method and system for digital down conversion and demodulation of a radio frequency (RF) signal. According to one aspect, the invention provides a method of determining a sampling frequency in a digital RF receiver. A first sampling frequency is selected to sample an analog signal. The selection is based at least in part on a predetermined bandwidth and a safety margin. When a bandwidth of the signal does not fall substantially within a predetermined frequency zone, then a second sampling frequency higher than the first sampling frequency is selected to sample the signal. The analog signal is sampled at the selected sampling frequency to produce a digitally down converted signal. The sampled signal is also demodulated at a demodulation frequency that is based at least in part on a carrier frequency of the analog signal.

According to another aspect, the invention provides a tunable RF receiver that includes a signal processor for sampling and demodulating a signal. The signal processor includes a sampling frequency determination module. The sampling frequency determination module determines a sampling frequency of the signal based on a predetermined bandwidth and a safety margin. The sampling frequency is chosen so that a bandwidth of the signal substantially falls within a predetermined frequency zone associated with the sampling frequency. The signal also includes an analog-to-digital converter. The analog-to-digital converter samples the signal at the determined sampling frequency. A digital demodulator digitally demodulates the sampled signal at a demodulation frequency tunable to be substantially equal to a baseband alias of a carrier frequency of the signal.

According to another aspect, the invention provides a method for processing a signal. A sampling frequency is determined based on a bandwidth of the signal. The sampling frequency is chosen so that the signal bandwidth substantially falls within a frequency zone approximately centered at one quarter the sampling frequency. The signal is demodulated at a tunable demodulation frequency based on the sampling frequency and a carrier frequency of the signal such that the demodulation frequency is substantially equal to a baseband alias of the carrier frequency.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
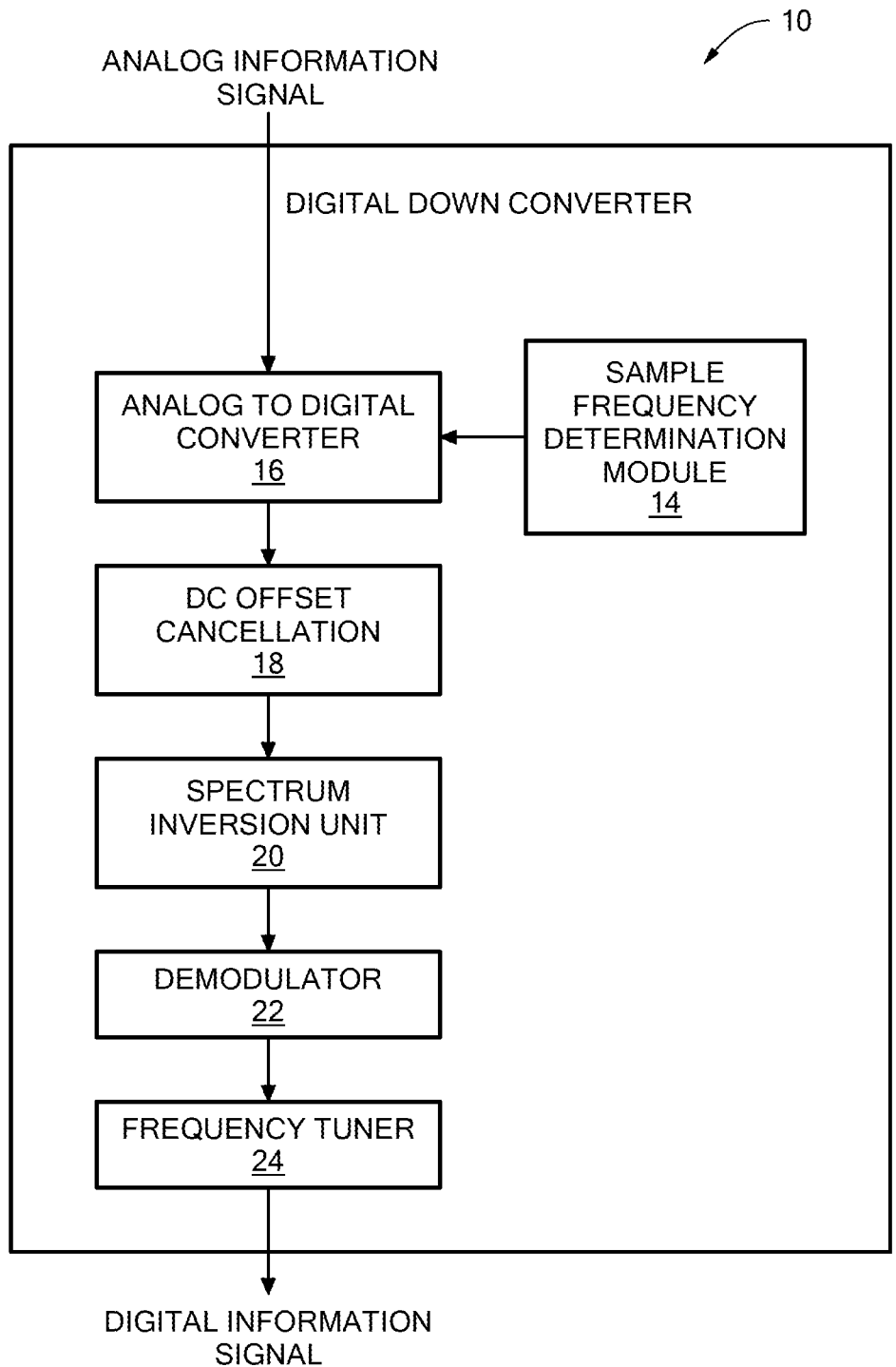
FIG. 1 is a block diagram of an exemplary digital down converter constructed in accordance with the principles of the present invention.

Before describing in detail exemplary embodiments that are in accordance with the present invention, it is noted that the embodiments reside primarily in combinations of apparatus components and processing steps related to digital down conversion and demodulation of a radio frequency (RF) signal in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures, in which like reference designators denote like elements, there is shown in FIG. 1 a diagram of an exemplary digital down converter constructed in accordance with the principles of the present invention, and generally denoted as down converter "10." Down converter 10 may include a sampling frequency determination module 14 to determine a sampling frequency at which to sample the received analog signal. The sampling frequency is determined according to a process such as the exemplary process described below with reference to FIG. 5. More particularly, the sampling frequency may be chosen based on a bandwidth and a safety margin so that a bandwidth of the signal substantially falls within a predetermined frequency zone associated with the sampling frequency.

A received analog signal is sampled at the determined sampling frequency in an analog-to-digital converter 16. The analog-to-digital converter 16 converts the received analog signal to a digital signal. This may introduce an undesirable DC component to the signal. The DC component may be cancelled by a DC offset cancellation module 18. The DC offset may be removed by, for example, subtracting a running average of the signal from the signal. The process of sampling the received analog signal may result in a reversed frequency spectrum, which is inverted by a spectrum inversion unit 20. The digital signal is demodulated by a digital demodulator 22. The output of the demodulator 22 may be offset from baseband by a small amount. Therefore, a frequency tuner 24 may be employed to shift the demodulated digital signal to baseband.

Figure 2:
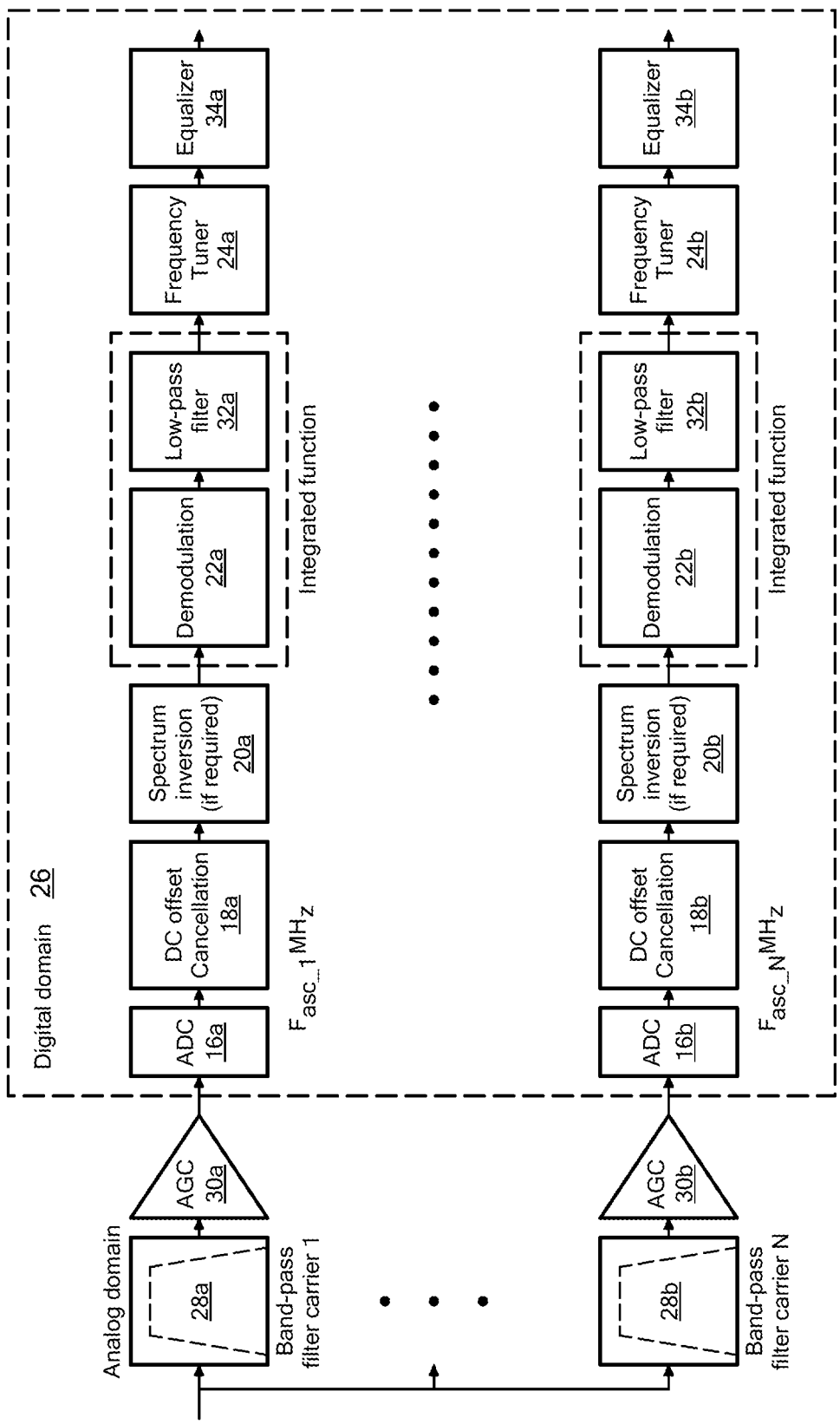
FIG. 2 is block diagram of an exemplary multiple-channel digital down converter for processing long term evolution (LTE) signals constructed in accordance with the principles of the present invention.

FIG. 2 is a block diagram of an exemplary multiple-channel digital down converter 26. A multi-channel digital down converter 26 may be used for processing long term evolution (LTE) signals. The elements of each channel are denoted "a" for channel 1, and "b" for channel N. However, the elements are referred to collectively herein by their reference number without inclusion of the alphabetic character. Each channel in FIG. 2 corresponds to a different carrier, e.g., LTE carrier, and a different frequency band. As shown in FIG. 2, an LTE signal is coupled to a plurality of band-pass filters 28, one for each carrier frequency. Of note, although embodiments are described with reference to LTE communication systems, the invention is not limited solely to LTE. It is contemplated that the present invention can be implemented with other multi-carrier technologies.

The LTE signal may be from an antenna or a power amplifier, depending on whether the processing chain of FIG. 2 is used in a communication receiver, or in a feedback receiver for power amplifier linearization. If the signal is received from an antenna in a communication receiver, the signal may be first applied to a low noise amplifier before being fed to the band-pass filters 28. If the signal is from a power amplifier, the signal may be attenuated by an attenuator before being fed to the band-pass filters 28.

A purpose of band-pass filter 28 is to isolate the spectrum associated with a carrier frequency and eliminate out of band noise. The output of a band-pass filter 28 is subject to automatic gain control (AGC) 30 to compensate for the time varying amplitude of the analog signal prior to being received by the digital down converter 26. The output of AGC 30 is input to the analog-to-digital converter 16, which converts the signal to digital form using the determined sampling frequency. The sampling frequency of the digital-to-analog converter is determined by a process such as the exemplary process described below with reference to FIG. 5.

The output of the analog-to-digital converter 16 is input to the DC offset cancellation module 18, which removes a DC offset introduced by the analog-to-digital converter 16. The output of the DC offset cancellation module 18 may be input to a spectrum inversion module 20 if spectrum inversion is needed.

The signal is then input to a demodulator 22 which removes the carrier from the signal and down converts the signal. Operation of the demodulator 22 is explained more fully below with reference to FIG. 4. A low pass filter 22 filters the down converted signal to eliminate images of the down converted signal introduced by demodulation.

A frequency tuner 24 may be used to offset the spectrum of the signal by a small frequency offset to center the spectrum of the signal at baseband. Finally, an equalizer 34 is applied to the signal to compensate for frequency dependent phase and amplitude distortions caused by an analog processing chain applied to the analog signal before it is digitized.

Thus, for each carrier frequency, the following operations may be performed: (1) selecting a sampling frequency, (2) sampling the signal, (3) performing frequency inversion, if needed, (4) determining the demodulation frequency, (5) demodulating the signal, (6) calculating the low pass filter coefficients (7) applying the low pass filter to the signal, (8) calculating the equalizer coefficients, and (9) applying the equalizer to the signal using the calculated equalizer coefficients.

Figure 3:
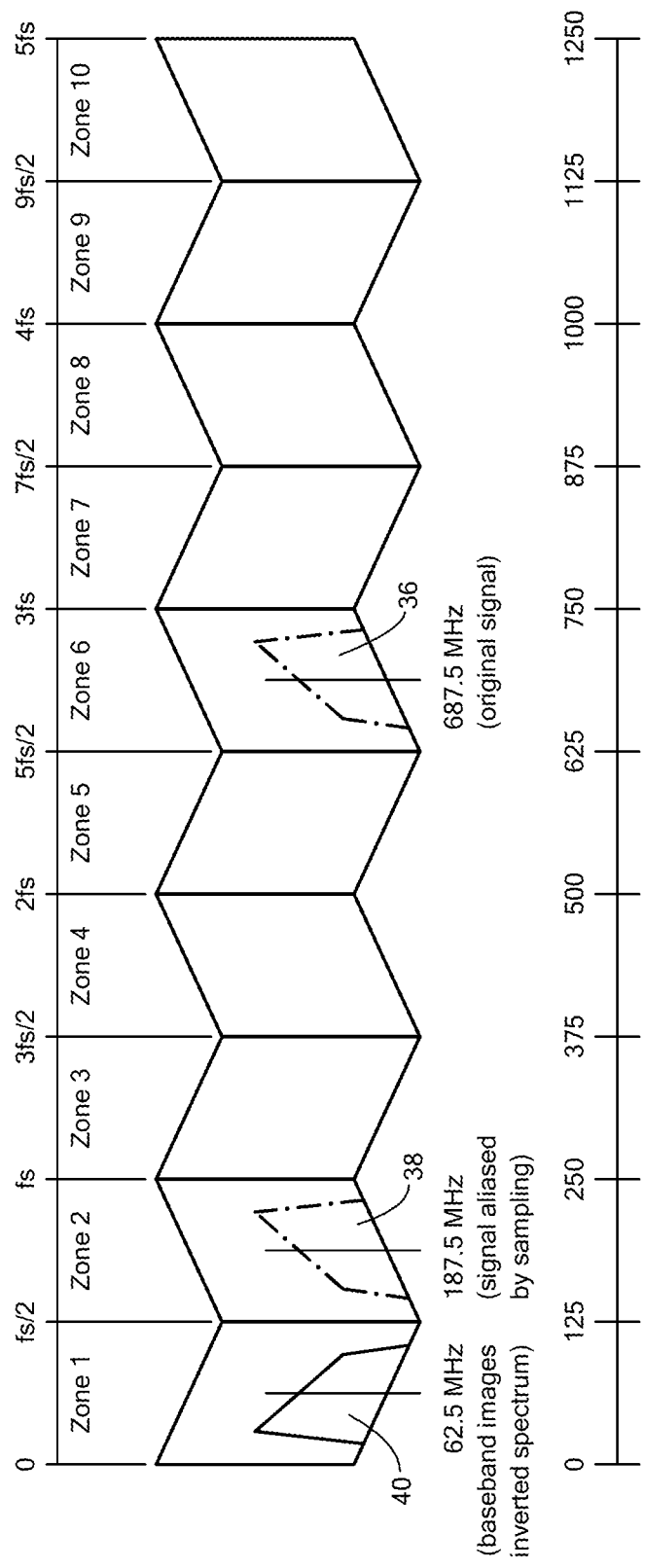
FIG. 3 is a spectrum chart illustrating an exemplary aliasing process used in the present invention.

FIG. 3 is a diagram of a plurality of frequency zones, called Nyquist zones, (zones 1-10), having a frequency distribution 36 of a radio frequency (RF) signal and images 38 and 40 of the frequency distribution of the RF signal. An example of a down conversion process is shown using a signal having a bandwidth of 100 Megahertz (MHz) centered at 687.5 MHz. The upper and lower frequency components of this signal are determined by:

$$f_{upper} = f + \frac{B}{2} = 687.5 + \frac{100}{2} = 737.5 \text{ Mhz}$$

$$f_{lower} = f - \frac{B}{2} = 687.5 - \frac{100}{2} = 637.5 \text{ Mhz}$$

where f is the center frequency of the spectrum. If the signal is sampled at 250 MHz, then upper and lower frequencies will then be aliased to:

$$f'_{upper} = f_{upper} - f_s \left\lfloor \frac{f_{upper}}{f_s} \right\rfloor = 237.5 \text{ MHz}$$

$$f'_{lower} = f_{lower} - f_s \left\lfloor \frac{f_{lower}}{f_s} \right\rfloor = 137.5 \text{ MHz}$$

where $f_s$ is the sampling frequency, and the function, $\lfloor arg \rfloor$, denotes the greatest integer less than the argument, which may also be referred to as the floor function.

The sampling process will also create equidistant images around $f_s/2$, which is 125 MHz in this example. The images will appear at the following frequencies:

$$f_{bb\_image\_upper} = \frac{f_s}{2} - \left(f_{upper} - \frac{f_s}{2}\right) = 12.5 \text{ MHz}$$

$$f_{bb\_image\_lower} = \frac{f_s}{2} - \left(f_{lower} - \frac{f_s}{2}\right) = 112.5 \text{ MHz}$$

In this example, $f_{bb\_image\_upper}$ is smaller than $f_{bb\_image\_lower}$. Thus the baseband images are frequency inverted. This is because the original spectrum was located in an even Nyquist zone (zone 6). Frequency inversion does not occur when the original spectrum is in an odd Nyquist zone. In this example, frequency inversion performed by the spectrum inversion unit 20 is applied to the signal. Various ways of performing frequency inversion are known, such as, for example, multiplying the signal by the sequence $s(n)=(-1)^n$, where n is the sampling index of the digital signal (i.e., n=1, 2, 3, 4, . . . ).

Figure 4:
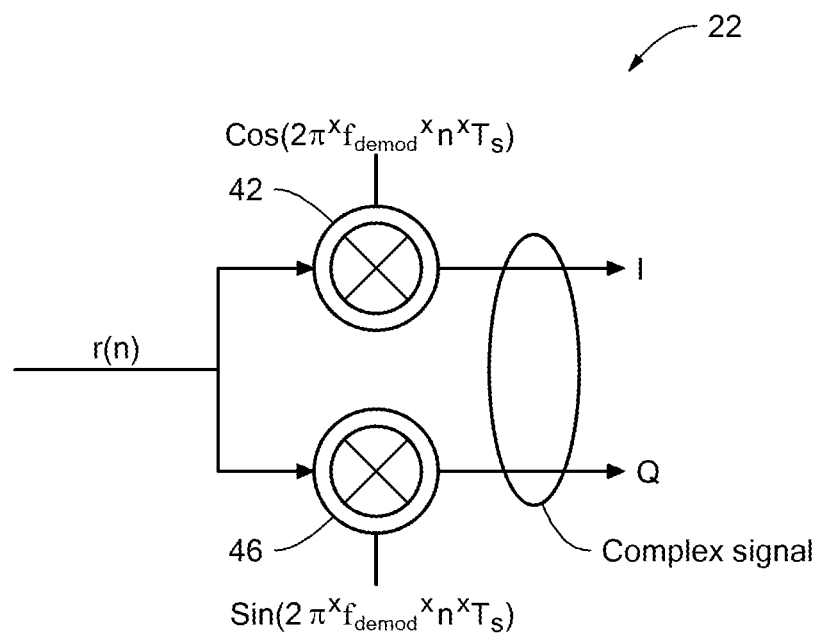
FIG. 4 is a block diagram of a digital quadrature demodulator constructed in accordance with the principles of the present invention.

FIG. 4 is a block diagram of an exemplary digital demodulator 22 constructed in accordance with the principles of the present invention. The incoming signal r(n) is split into two channels and input to a multiplier in each channel. One multiplier 42 multiplies the signal r(n) by $\cos(2\pi f_{demod} \times n \times T_s)$ and the other multiplier 46 multiplies the signal r(n) by $\sin(2\pi f_{demod} \times n \times T_s)$, where $f_{demod}$ is the demodulation frequency, and $T_s$ is the sampling period. The result of these multiplications is an I channel signal and a Q channel signal, each having a spectrum at or very near baseband.

The choice of the demodulation frequency, $f_{demod}$, applied by the demodulator 22 of FIG. 4 depends upon whether the frequency inversion referred to above is performed. As explained above, frequency inversion is performed when the original signal falls within an even Nyquist zone. When frequency inversion is not performed then the demodulation frequency may be chosen as:

$$f_{demod} = f_{carrier} - f_s \left\lfloor \frac{f_{carrier}}{f_s} \right\rfloor.$$

When frequency inversion is performed then the demodulation frequency may be chosen as:

$$f_{demod} = f_s - \left( f_{carrier} - f_s \left\lfloor \frac{f_{carrier}}{f_s} \right\rfloor \right)$$

where $f_{demod}$ is the demodulation frequency, $f_{carrier}$ frequency, $f_s$ is the sampling frequency and the function, $\lfloor arg \rfloor$, denotes the greatest integer less than the argument. Thus, in some embodiments, the demodulation frequency is selected to be substantially equal to a baseband alias of a carrier frequency of the signal.

In an alternative embodiment, the demodulation frequency may be chosen as:

$$f_{demod} = \frac{f_s}{4}.$$

A benefit to choosing this demodulation frequency is that hardware complexity of the low pass filter 32 that follows the demodulator 22 is reduced. A particular example of an optimized demodulator and filter that uses this demodulation frequency is presented in U.S. patent application Ser. No. 12/970,151, entitled "Integrated Demodulator, Filter and Decimator (DFD) for a Radio Receiver," filed on Dec. 16, 2010, and incorporated herein in its entirety by reference.

Note that when using the demodulation frequency, $$f_{demod} = \frac{f_s}{4},$$

the resultant demodulated signal may be offset from baseband by a small frequency offset. Hence, the frequency tuner 24 shifts the demodulated signal by a small frequency shift as follows:

$$H_{shift}(\omega) = H(\omega) \times e^{j2\pi \times (\pm f_{shift}) t}$$

where $H_{shift}(\omega)$ is the shifted spectrum of the signal, $H(\omega)$ is the spectrum of the demodulated signal and $\pm f_{shift}$ is the frequency shift by which the spectrum of the signal is shifted.

Figure 5:
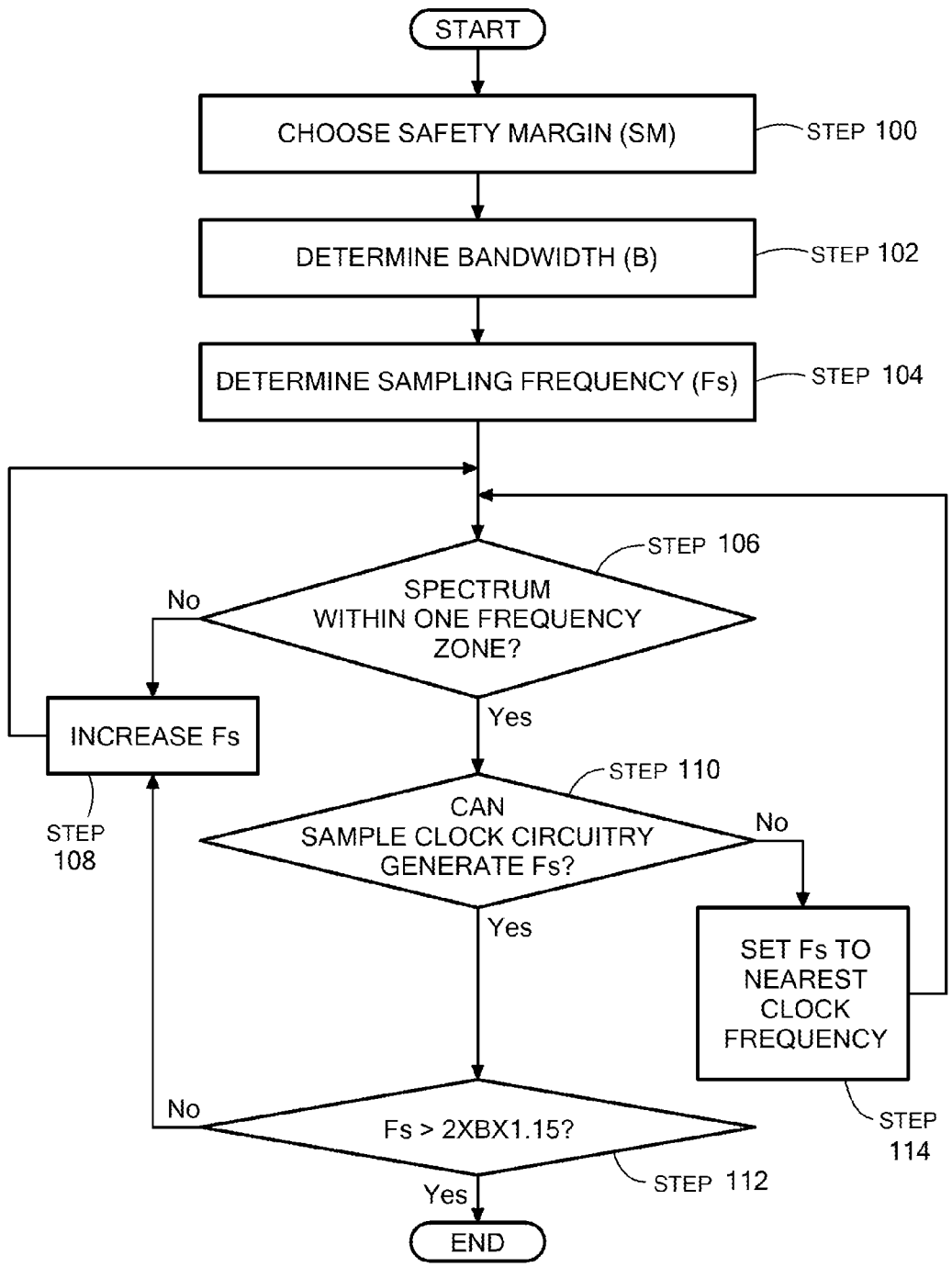
FIG. 5 is a flowchart of an exemplary process for selecting a sampling frequency in accordance with the principles of the present invention.

FIG. 5 is a flow chart of an exemplary process for selecting a sampling frequency in accordance with the principles of the present invention. A safety margin (SM) is chosen (step S100) and a bandwidth (B) of the signal is determined (step S102). The sampling frequency is determined (step S104) according to:

$$f_s = 2.0 \times B \times SM.$$

A determination is made at to whether the resultant sampled signal will have a spectrum that falls substantially within a predetermined frequency zone, such as a Nyquist zone (step S106). For example, the spectrum may fall within a predetermined frequency zone when the following relationship holds:

$$\left\lceil \frac{f_{lower}}{\frac{f_s}{2}} \right\rceil = \left\lceil \frac{f_{upper}}{\frac{f_s}{2}} \right\rceil$$

where $f_{lower}$ is a lower frequency component of a spectrum of the signal, $f_{upper}$ is an upper frequency component of the spectrum of the signal, $f_s$ is the sampling frequency, and the function, $\lceil arg \rceil$, denotes the smallest integer greater than the argument.

When the bandwidth of the signal does not fall substantially within the predetermined frequency zone, then a second sampling frequency higher than the first sampling frequency is chosen (step S108). When the spectrum of the signal does fall substantially within the predetermined frequency zone, then a determination is made as to whether the sampling frequency is one that can be generated by a clock circuitry (step S110). If the sampling frequency is one that can be generated by the clock circuitry, then a determination is made whether the sampling frequency satisfies:

$$f_s > 2.0 \times B \times 1.15 \quad \text{(step S112).}$$

If this relationship is satisfied, then the sampling frequency determination process ends.

If this relationship is not satisfied, then a new higher frequency is chosen as the sampling frequency (step S108). Returning to step S110, if the current sampling frequency is not one that can be generated by the clock circuitry, then the nearest frequency to the current sampling frequency that can be generated by the clock circuitry is selected (step S114). Note that a safety margin of 1.15 was used in FIG. 5. However, the present invention is not limited to such. For example, another safety margin, such as 1.20, may be used. The safety margin may be chosen to be just large enough to avoid substantial aliasing of the signal. Generally, the selected sampling frequency, and hence, the safety margin, may be chosen as low as possible to reduce power consumption.

Thus, one embodiment is a method for determining a sampling frequency to digitize and down convert an analog RF signal. A first sampling frequency is selected based at least in part on a predetermined bandwidth and a safety margin. The method includes determining whether the bandwidth of the signal of the signal falls substantially within a predetermined frequency zone associated with the first sampling frequency When the bandwidth does not fall substantially within the predetermined frequency zone, a second sampling frequency higher than the first sampling frequency is selected.

Figure 6:
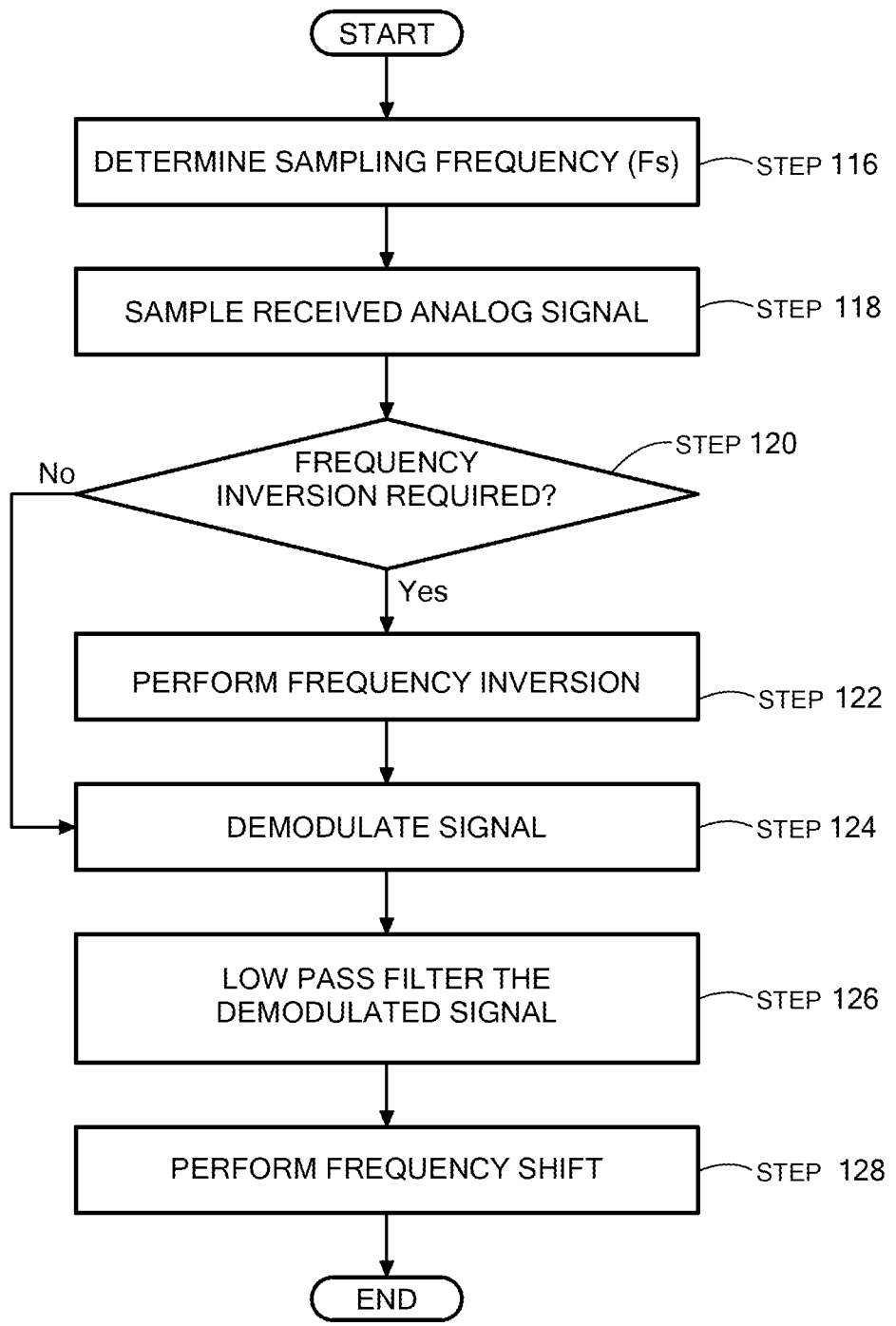
FIG. 6 is a flowchart of an exemplary process for down converting an RF signal according to the principles of the present invention.

FIG. 6 is a flow chart of an exemplary process for down converting an RF signal according to the principles of the present invention. A sampling frequency may be determined according to the steps shown in FIG. 5 (step S116). The analog signal is sampled using the determined sampling frequency (step S118). A determination is made whether frequency inversion is to be performed (step S120). If $$\left\lceil \frac{f_{lower}}{\frac{f_s}{2}} \right\rceil = \left\lceil \frac{f_{upper}}{\frac{f_s}{2}} \right\rceil = \text{an even number,}$$

then frequency inversion is required.
If $$\left\lceil \frac{f_{lower}}{\frac{f_s}{2}} \right\rceil = \left\lceil \frac{f_{upper}}{\frac{f_s}{2}} \right\rceil = \text{an odd number}$$

then frequency inversion is not required.

If frequency inversion is required, the frequency inversion is performed (step S122). The signal is demodulated (step S124) and low pass filtered (step S126). The low pass filtered signal is then shifted to baseband, if necessary, (step S128).

Advantages of the present invention may include providing signal processing that is easily tunable to a desired carrier frequency and bandwidth. Such tuning can be implemented by re-programming a signal processor, thereby reducing non-recurring engineering costs. Further, according to the methods described herein, a reduced amount of discrete components are required as compared to the amount of components required for analog down conversion.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of digital down conversion of a signal in a radio frequency (RF) receiver, the method comprising:
    selecting a first sampling frequency as the selected sampling frequency to sample an analog signal, the selecting being based at least in part on a predetermined bandwidth and a safety margin;
    determining whether a bandwidth of the analog signal falls substantially within a predetermined frequency zone associated with the first sampling frequency;
    when the bandwidth of the analog signal does not fall substantially within the predetermined frequency zone, then selecting a second sampling frequency, higher than the first sampling frequency, as the selected sampling frequency to sample the analog signal;
    sampling the analog signal at the second sampling frequency as the selected sampling frequency to produce a digitally down converted signal; and
    digitally demodulating the sampled signal at a demodulation frequency that is tunable, the demodulation frequency based at least in part on a carrier frequency of the analog signal
    wherein the demodulation frequency depends on whether frequency inversion is applied to the signal, and when frequency inversion is not applied to the signal, the demodulation frequency is determined by the relationship:

$$f_{demod} = f_{carrier} - f_s \left\lfloor \frac{f_{carrier}}{f_s} \right\rfloor;$$

and
    when frequency inversion is applied to the signal, the demodulation frequency is determined by the relationship:

$$f_{demod} = f_s - \left( f_{carrier} - f_s \left\lfloor \frac{f_{carrier}}{f_s} \right\rfloor \right);$$

where $f_{demod}$ is the demodulation frequency, $f_{carrier}$ is the carrier frequency, $f_s$ is the sampling frequency and the function, $\lfloor arg \rfloor$, denotes the greatest integer less than the argument.

2. The method of claim 1, further comprising determining if clock circuitry of the RF receiver is capable of generating the selected sampling frequency.

3. The method of claim 2, further comprising, when the clock circuitry is not capable of generating the selected sampling frequency, then selecting a third sampling frequency as the selected sampling frequency that can be generated by the clock circuitry, the third sampling frequency being a frequency of the clock circuitry that is nearest in frequency to the one of the first and second sampling frequencies selected as the selected sampling frequency to sample the analog signal.

4. The method of claim 1, wherein the first sampling frequency is selected to satisfy the following relationship:

$$f_s = 2.0 \times B \times SM$$

where $f_s$ is the selected sampling frequency, B is the bandwidth of the signal, and SM is the safety margin.

5. The method of claim 4, wherein the safety margin is at least 1.15.

6. The method of claim 1, wherein the predetermined frequency zone is a Nyquist frequency zone.

7. The method of claim 6, further comprising performing frequency inversion upon the signal when the signal falls within an even Nyquist zone.

8. A tunable radio frequency (RF) receiver, the RF receiver comprising:
    a signal processor, the signal processor sampling and demodulating a signal, the signal processor including:

a sampling frequency determination module, the sampling frequency determination module being tunable to determine a sampling frequency of the signal based on a carrier frequency of the signal, a predetermined bandwidth and a safety margin so that a bandwidth of the signal substantially falls within a predetermined frequency zone associated with the determined sampling frequency;

an analog-to-digital converter, the analog-to-digital converter sampling the signal at the determined sampling frequency; and a digital demodulator, the digital demodulator digitally demodulating the determined sampled signal at a demodulation frequency, the demodulation frequency being tunable to be substantially equal to a baseband alias of a carrier frequency of the signal, wherein:

when frequency inversion is not performed on an alias of the signal, then the demodulation frequency is chosen to satisfy the following relationship:

$$f_{demod} = f_{carrier} - f_s \left\lfloor \frac{f_{carrier}}{f_s} \right\rfloor;$$

and when frequency inversion is performed on an alias of the signal, then the demodulation frequency is chosen to satisfy the following relationship:

$$f_{demod} = f_s - \left( f_{carrier} - f_s \left\lfloor \frac{f_{carrier}}{f_s} \right\rfloor \right);$$

where $f_{demod}$ is the demodulation frequency, $f_{carrier}$ is the carrier frequency, $f_s$ is the determined sampling frequency and the function, $\lfloor arg \rfloor$, denotes the greatest integer less than the argument.

9. The RF receiver of claim 8, wherein the demodulator frequency is chosen according to:

$$f_{demod} = \frac{f_s}{4}$$

where $f_{demod}$ is the demodulation frequency, $f_s$ is the determined sampling frequency, and wherein demodulating the sampled signal further comprises shifting a spectrum of the signal approximately to baseband.

10. The RF receiver of claim 9, wherein the shifting of the spectrum satisfies the following relationship:

$$H_{shift}(\omega) = H(\omega) \times e^{j2\pi \times (\pm f_{shift})t}$$

where $H_{shift}(\omega)$ is the shifted spectrum of the signal, $H(\omega)$ is the spectrum of the signal and $\pm f_{shift}$ is the frequency shift by which the spectrum of the signal is shifted.

11. The RF receiver of claim 8, wherein determining a sampling frequency so that a bandwidth of the signal substantially falls within a predetermined frequency zone comprises determining if the sampling frequency satisfies the following relationship:

$$\left\lceil \frac{f_{lower}}{\frac{f_s}{2}} \right\rceil = \left\lceil \frac{f_{upper}}{\frac{f_s}{2}} \right\rceil$$

where $f_{lower}$ is a lower frequency component of a spectrum of the signal, $f_{upper}$ is an upper frequency component of the spectrum of the signal, $f_s$ is the determined sampling frequency, and the function, $\lceil arg \rceil$, denotes the smallest integer greater than the argument.

12. The RF receiver of claim 8, further comprising clock circuitry, the clock circuitry generating the determined sampling frequency, and wherein the sampling frequency determination module determines a sampling frequency that satisfies the following two relationships:

$$f_s \geq 2.0 \times B \times SM$$

and $$\left\lceil \frac{f_{lower}}{\frac{f_s}{2}} \right\rceil = \left\lceil \frac{f_{upper}}{\frac{f_s}{2}} \right\rceil$$

where $f_s$ is the determined sampling frequency, B is the bandwidth of the signal, SM is the safety margin, $f_{lower}$ is a lower frequency component of a spectrum of the signal, $f_{upper}$ is an upper frequency component of the spectrum of the signal, and the function, $\lceil arg \rceil$, denotes the smallest integer greater than the argument.

13. The RF receiver of claim 12, wherein the safety margin is at least 1.2.

14. The RF receiver of claim 8, further comprising a frequency inverter, coupled between the analog-to-digital converter and the digital demodulator, and configured to perform frequency inversion of the signal.

15. The RF receiver of claim 8, further comprising a plurality of the signal processors parallel-coupled to one another, each signal processor processing a corresponding one of a plurality of signals received by the RF receiver.

16. The RF receiver of claim 15, wherein the plurality of signals comprise a Long Term Evolution (LTE) signal.

17. A method for processing a signal, comprising:
determining a sampling frequency based on a bandwidth of the signal, the sampling frequency chosen so that the signal bandwidth substantially falls within a predetermined frequency zone; and demodulating the signal at a tunable demodulation frequency, the demodulation frequency based on the sampling frequency and a carrier frequency of the signal such that the demodulation frequency is substantially equal to a baseband alias of the carrier frequency;

wherein the demodulation frequency depends on whether frequency inversion is applied to the signal, and when frequency inversion is not applied to the signal, the demodulation frequency is determined by the relationship:

$$f_{demod} = f_{carrier} - f_s \left\lfloor \frac{f_{carrier}}{f_s} \right\rfloor;$$

and when frequency inversion is applied to the signal, the demodulation frequency is determined by the relationship:

$$f_{demod} = f_s - \left(f_{carrier} - f_s \left\lfloor \frac{f_{carrier}}{f_s} \right\rfloor\right);$$

where $f_{demod}$ is the demodulation frequency, $f_{carrier}$ is the carrier frequency, $f_s$ is the sampling frequency and the function, $\lfloor arg \rfloor$, denotes the greatest integer less than the argument.

18. The method of claim 17, wherein the sampling frequency is iteratively determined to substantially achieve the following condition:

$$\left\lceil \frac{f_{lower}}{\frac{f_s}{2}} \right\rceil = \left\lceil \frac{f_{upper}}{\frac{f_s}{2}} \right\rceil$$

where $f_{lower}$ is a lower frequency component of a spectrum of the signal, $f_{upper}$ is an upper frequency component of the spectrum of the signal, $f_s$ is the sampling frequency, and the function, $\lceil arg \rceil$, denotes the smallest integer greater than the argument.

\* \* \* \* \*